July 11, 1950  D. L. McFARLAND  2,514,888
AIRCRAFT WING TIP FUEL TANK INSTALLATION
Filed Jan. 31, 1947  4 Sheets-Sheet 2

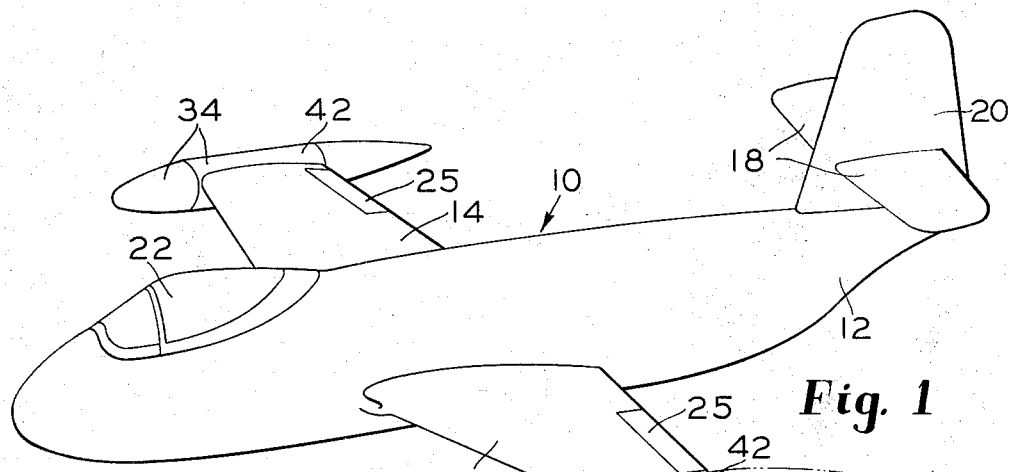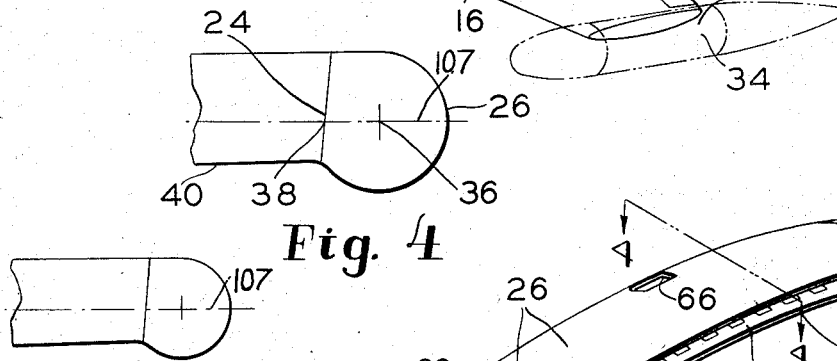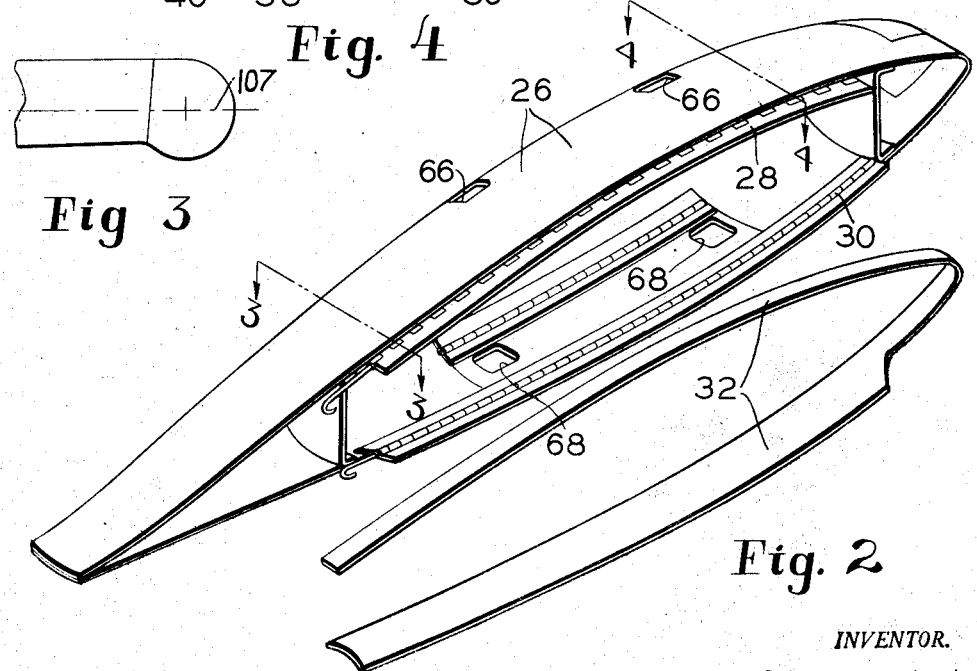

INVENTOR.
D. L. McFarland
BY M. B. Tasker
ATTORNEY

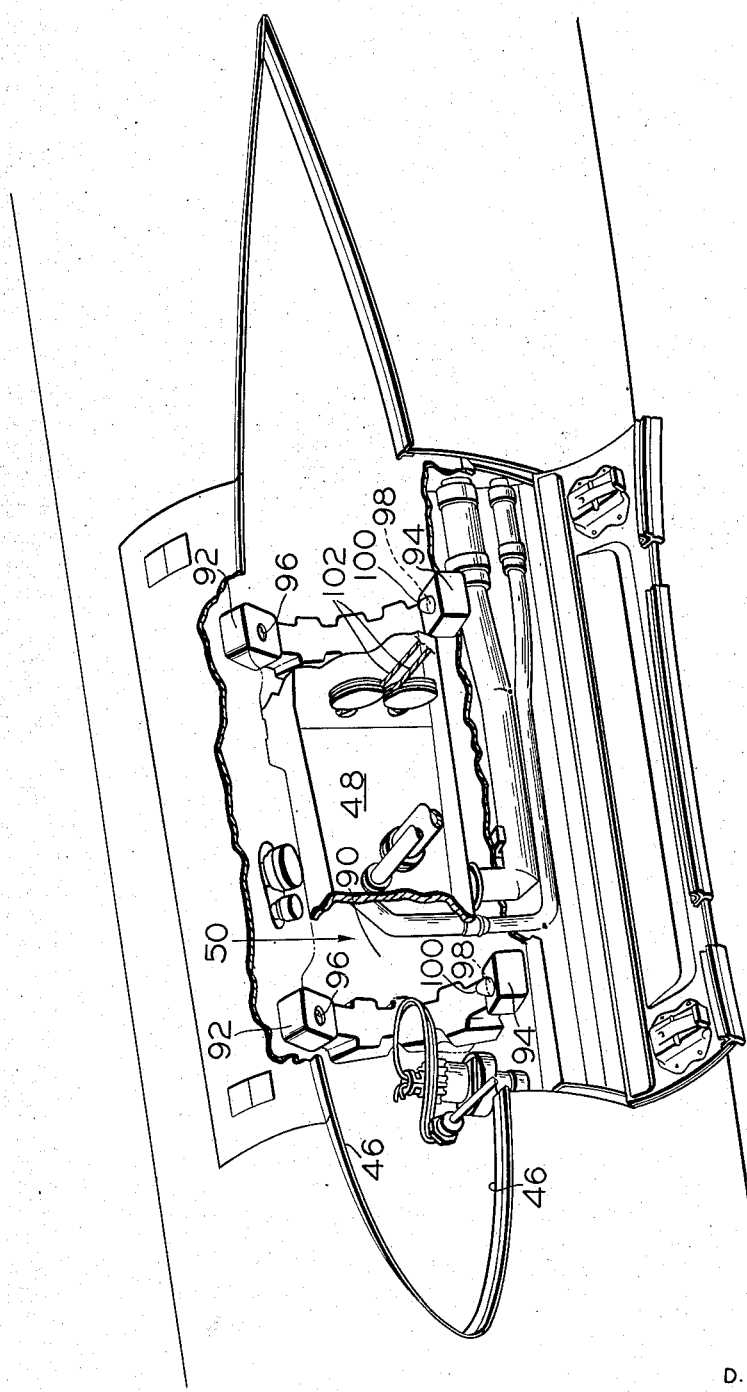

INVENTOR.
D. L. Mc Farland
BY M. B. Tasker
ATTORNEY

Patented July 11, 1950

2,514,888

UNITED STATES PATENT OFFICE 2,514,888

AIRCRAFT WING TIP FUEL TANK INSTALLATION

Donald L. McFarland, Milford, Conn., assignor to United Aircraft Corporation, East Hartford, Conn., a corporation of Delaware Application January 31, 1947, Serial No. 725,439

5 Claims. (Cl. 244—135)

This invention relates to aircraft and particularly to airplanes adapted to carry disposable wing tip units.

Conventional cambered wing tips have shapes that are not symmetrical about their chord lines, thus creating undesirable drag when drop tanks are used which necessitate the use of undesirable fillets. These fillets make the construction and installation of drop tanks more complicated, add considerable weight and decrease the performance of the airplane.

It is an object of this invention to provide an improved wing tip construction for supporting drop tanks and the like.

A further object of this invention is to produce an improved wing tip construction which forms a section between the tank and the outer wing panel that is smooth and aerodynamically clean and which actually increases the effective area of the wing, thus reducing wing loading and increasing the efficiency of the airplane.

A further object of the invention is to provide a wing tip and droppable tank construction in which the intersection between the wing and the tank is a continuous line that circumscribes the outer wing panel extremity and eliminates the necessity for fillets between the wing and the tank at their intersection.

A further object of the invention is the provision of a wing tip and drop tank construction in which the drop tanks at the wing tip extremities of the two wings are interchangeable.

A still further object of the invention is generally to improve the construction and performance of airplanes equipped with disposable wing tip units.

These and other objects and advantages of the invention will be apparent or will be pointed out in connection with the following detailed description of the accompanying drawings which illustrate one embodiment of the invention.

In these drawings:

Fig. 1 is a perspective view of an airplane equipped with disposable wing tip fuel tanks and embodying the invention;

Fig. 2 is a perspective view of a detachable wing tip constructed in accordance with this invention and showing the means for attaching it to the wing;

Figure 5:
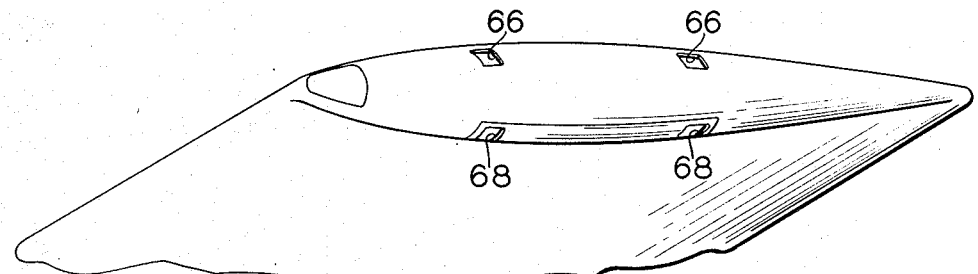
Figure 6:
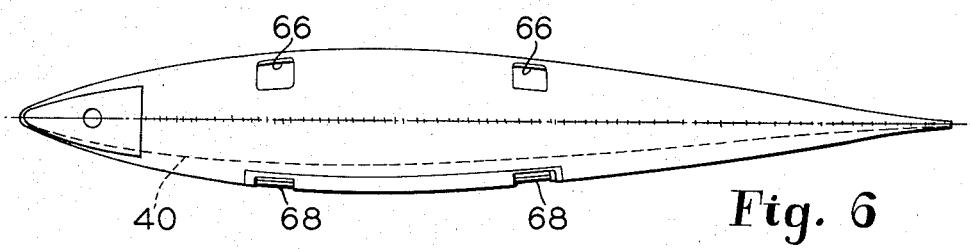
Figure 7:
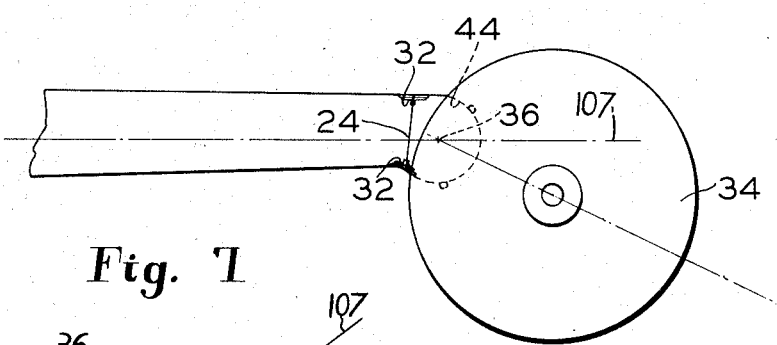
Figure 10:
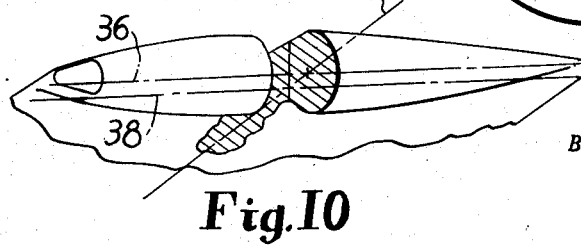
Figure 9:
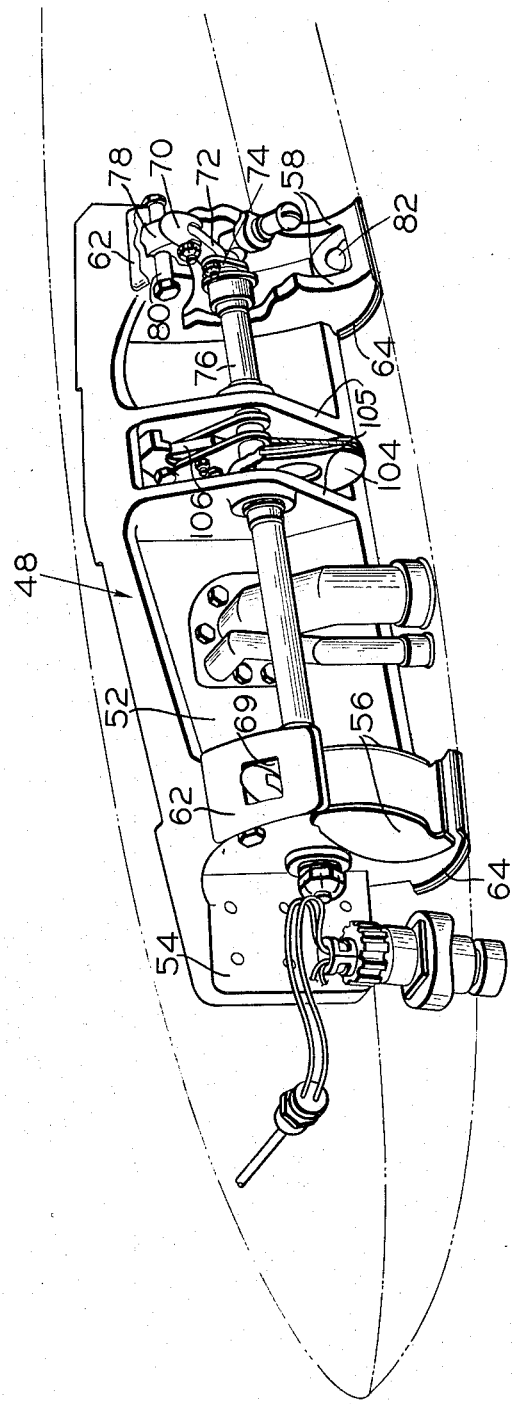

Figs. 3 and 4 are sectional views on lines 3—3 and 4—4 respectively of Fig. 2;

Fig. 5 is a perspective view of one of the wing tips of Fig. 1 with the tank removed;

Fig. 6 is a side elevation of the wing tip of Fig. 5;

Fig. 7 is a front view of a wing tip with a fuel tank secured thereto;

Fig. 8 is a view looking outboard of the right-hand wing tip showing the tank-carried attaching mechanism;

Fig. 9 is a view looking inboard of the left-hand wing tip showing the wing-carried attaching mechanism; and Fig. 10 is a perspective view of the wing tip and the outer portion of the wing panel, similar to Fig. 5, but with the central portion broken away to show chord lines.

Referring to Fig. 1, an airplane generally indicated at 10 has a fuselage 12, oppositely extended wings 14 and 16, horizontal and vertical tail surfaces 18 and 20 and a forward pilot compartment 22. The outer panels of wings 14 and 16 end abruptly in a chordal section 24 and are provided with trailing edge ailerons 25 which terminate just short of the tips of the outer wing panels. Replaceable wing tips, one of which is generally indicated by the numeral 26 in Fig. 2, are secured to the tips of the outer wing panels by piano hinges 28 and 30, the cooperating sections of each of which are carried by the upper and lower shell structure of the wing panel and the wing tip surfaces respectively. In order to form a good line of intersection between the wing tip and the outer wing panel, a strip 32 of metal is provided which extends around the wing panel tip and is secured thereto and to which the panel carried strips of hinges 28 and 30 are secured.

Detachable wing tips per se are well known. The wing tips 26, however, are of an improved construction which enables them to receive wing tip drop tanks 34 in an improved manner by which the section between the tanks and the wing outer panels is smooth and aerodynamically clean.

To this end the wing tip 26 is constructed so that it is symmetrical about a wing tip chord line 36 which is outboard of and parallel with the chord line 38 in the outer panel section 24. A chord is an arbitrary datum line from which the ordinates and angles of an airfoil are measured. In accordance with generally accepted practice, and in this instance, chord line 38 is the straight line between the leading and trailing edges of the wing at section 24 generally parallel to the longitudinal axis of the airplane and, similarly, chord line 36 is the straight line between the leading and trailing edges of the wing tip parallel to chord line 38. As shown in Fig. 10, chord line 38 of the wing at section 24 and chord line 36 of the wing tip are parallel and both lie in the same horizontal plane as line 107. The true lines of symmetry about the chord line 36 are obtained by laterally extending the line of the wing upper surface at section 24 to a vertical plane through chord line 36 and then rotating said line about the chord line 36 until the surface of revolution generated intersects the lower surface 40 of the outer panel adjacent said section 24. It will be evident from Figs. 3, 4, and 7 that the surface of revolution thus provided is symmetrical about the chord line 36 throughout its length.

As shown most clearly in Fig. 1 the drop tanks 34 are provided with a cylindrical mid-section 42 which is at least coextensive with the chordal length of the wing tips 26 and this cylindrical section is provided with an inboard well 44 in position to receive a little more than 180° of the periphery of the cylindrical wing tip 26. It will be noted that said intersection forms a continuous line 46, generally elliptical in shape, that circumscribes and accurately conforms to the entire outer panel extremity and thus eliminates the need for fillets between the tank and the wing surfaces which were formerly required when a drop tank was installed on a non-symmetrical wing tip.

Cooperating locking mechanisms generally indicated at 48 and 50 respectively are carried by the wing tip 26 and the tank 34 respectively of each wing. As shown most clearly in Fig. 9, locking mechanism 48 includes a casting 52 which is secured by bolts passing through lugs 54 at the opposite ends of the casting to the fore and aft wing beams (not shown). The casting 52 includes integral pairs of webs 56 and 58 adjacent its ends having bridging arcuate surfaces 62 above the median plane of the wing and similar arcuate surfaces 64 below said plane, these surfaces being flush with and projecting through apertures 66 and 68 in the wing tip shell. Surfaces 62 have apertures 69 therein through which latch plungers 70 are projectable by toggle mechanism including a link 72 and arms 74 fixed on a latch operating shaft 76. The latch plungers 70, which have cylindrical, tapered ends, are a part of bellcrank shaped members 78 pivoted on bolts 80 between the spaced webs 56 and 58 so that when the toggle comprising links 72 and arms 74 are in the straightened position shown in Fig. 9, the cylindrical plungers 70 are projected beyond the arcuate surfaces 62, and hence beyond the cylindrical surface of the wing tip 26. The surfaces 64 on the lower surface of the wing tip have apertures 82 therein the purpose of which will hereinafter be explained.

The locking mechanism in the wells of the right and left hand drop tanks are identical and while a right hand tank is shown in Fig. 8, its locking mechanism will be described as applying to a left hand tank matching the locking mechanism in the left hand wing tip described above. The locking mechanism 50 in the wells of each of the drop tanks 34 includes a casting 90 which is generally semi-circular in configuration and is provided with upper pads 92 and lower pads 94 provided with apertures 96 and 98 respectively. The upper apertures 96 are adapted to receive the tapered cylindrical latch plungers 70 and the lower apertures 98 are adapted to receive one end of pins 100, the projecting tapered cylindrical ends of which are identical with the ends of latch plungers 70. The projecting ends of pins 100 are receivable in apertures 82 in the lower arcuate surfaces of casting 52.

For the purpose of making the tanks interchangeable, and since the ends of pins 100 are identical with the ends of latch plungers 70, the pins 100 may also be seated in apertures 96 and the latch plungers 70 may also be receivable in the apertures 98. Thus a tank 34 which is on one wing tip where the wing tip carried latch plungers 70 are received in the tank apertures 96 and the pins 100, which are seated in tank apertures 98, have their projecting tapered ends received in wing tip apertures 82, can be rotated bodily over the top of the airplane to position it on the other wing tip in which case the pins 100 would be seated in tank apertures 96, which would then be lowermost, and would enter the lower apertures 82 of the wing tip and the wing tip latch plungers 70 would enter tank apertures 98 which would then be uppermost.

The rotation of shaft 76 to break the toggles 74, 72 is under the control of the pilot. To this end pilot operated control mechanism (not shown) is provided in the cockpit 22 which is connected by cables 102 to a sector-wheel 104, located between webs 105 of casting 52, which wheel is operatively connected with an arm 106 splined to the shaft 76.

When it is desired to release the tank, the pilot operates his controls to rotate the shaft 76 and break the toggle 74 and 72, thus rocking the bellcranks 78 and withdrawing the latch plungers 70 from the upper apertures, as for example the apertures 96 in Fig. 8. The tank thus released swings outwardly at the top away from the wing tip until it is clear of the latter, as guided by the pins 100.

The above described locking and releasing mechanism is described more in detail and is claimed in a copending application, Serial No. 725,902, filed February 1, 1947, now matured into Pat. No. 2,505,604, and reference is made thereto for a more detailed understanding of these mechanisms.

It will be evident that as a result of this invention an improved wing tip construction has been provided for supporting disposable units on tips of an airplane by which the junction between the wing and the unit is aerodynamically clean without the use of fillets. It will also be evident that a construction has been provided by which left and right-hand drop tanks are avoided and any tank can be installed on either wing. Also as a result of this invention a drop tank construction has been provided having a minimum of weight and drag and by which the lift of the wing is actually increased by the presence of the tank.

While only one embodiment of the invention has been shown and described herein it will be evident that various changes in the construction and the arrangement of the parts may be resorted to without departing from the scope of the invention. For example, the invention is not limited to drop fuel tanks but is equally applicable to any other disposable unit which may be attached to a wing tip.

What it is desired to secure by Letters Patent is:

1. In an airplane, a wing having upper and lower surfaces and having a tip which is enlarged about a fore-and-aft axis relative to the thickness of the adjacent wing section, said tip being formed by rotating a lateral extension of the upper wing surface, taken at its extremity, about a line in said tip parallel to a chord line at the extremity of said wing until the surface of revolution generated by said rotation intersects the lower wing surface.

2. In an airplane, a wing having upper and lower surfaces and having an outer panel terminating in an outer panel tip section and a wing tip enlarged about a fore-and-aft axis relative to the thickness of the adjacent wing section comprising a surface of revolution formed by rotating a lateral extension of the upper surface line of said outer panel at said tip section about a chord line of said tip section until it intersects the lower surface of said panel.

3. In an airplane, a wing having upper and lower surfaces and having an outer wing panel terminating in a wing chord section and a wing tip forming an extension of said section, said wing tip terminating in a surface of revolution formed by rotating a lateral extension of the upper surface line of said wing at said section about a chord line of said wing tip located outboard of said section until the surface of revolution generated intersects the lower surface of said panel, said lateral extension of the upper surface line of said wing at said section being extended laterally to a vertical plane through said chord line of said wing tip.

4. In an airplane, a wing having upper and lower surfaces and having an outer wing panel terminating in a wing chord section and a wing tip forming an extension of said section, said wing tip terminating in a surface of revolution formed by rotating a lateral extension of the upper surface line of said wing at said section about a fore and aft axis of said wing tip parallel to but outboard of a chord line of said wing at said section until it intersects the lower surface of said wing panel, a drop tank having a well in its side to receive said wing tip, and cooperating locking means carried by said wing and tank for releasably securing said tank to said wing tip, said lateral extension of the upper surface line of said wing at said section being extended laterally to a vertical plane through said fore and aft wing tip axis.

5. In an airplane, a wing having upper and lower surfaces and a wing tip enlarged in spanwise section relative to its adjacent wing section and forming an extension of said surfaces, said wing tip having a generally circular spanwise cross section at any point along a fore-and-aft chord line of said wing tip and having its uppermost surface at any point along the length of said wing tip in the same horizontal plane as the adjacent upper surface of said wing, a drop tank having a cylindrical mid-section provided with a well in its inboard side into which said wing tip projects, and cooperating locking means carried by said wing and tank for releasably securing said tank to said wing tip.

DONALD L. McFARLAND.

REFERENCES CITED

The following references are of record in the file of this patent:

UNITED STATES PATENTS

| Number | Name | Date |
|---|---|---|
| 2,074,201 | Bechereau | Mar. 16, 1937 |
| 2,421,699 | Johnson | June 3, 1947 |
| 2,485,218 | Shaw | Oct. 18, 1949 |

FOREIGN PATENTS

| Number | Country | Date |
|---|---|---|
| 850,918 | France | Sept. 25, 1939 |